(12) United States Patent
Klett et al.

(10) Patent No.: US 7,670,682 B2
(45) Date of Patent: Mar. 2, 2010

(54) METHOD AND APPARATUS FOR PRODUCING A CARBON BASED FOAM ARTICLE HAVING A DESIRED THERMAL-CONDUCTIVITY GRADIENT

(75) Inventors: James W. Klett, Knoxville, TN (US); Christopher Stan Cameron, Sanford, NC (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/862,325

(22) Filed: Sep. 27, 2007

(65) Prior Publication Data

US 2009/0087373 A1   Apr. 2, 2009

(51) Int. Cl.
*B32B 9/00* (2006.01)
(52) U.S. Cl. .................................. 428/408; 423/447.1
(58) Field of Classification Search ................ 428/408; 264/29.1; 423/448, 447.1, 447.2
See application file for complete search history.

(56) References Cited

U.S. PATENT DOCUMENTS

| | | | |
|---|---|---|---|
| 4,442,165 A * | 4/1984 | Gebhardt et al. ......... 428/307.7 |
| 6,033,506 A | 3/2000 | Klett | |
| 6,037,032 A | 3/2000 | Klett | |
| 6,261,485 B1 | 7/2001 | Klett | |
| 6,287,375 B1 | 9/2001 | Klett | |
| 6,344,159 B1 | 2/2002 | Klett | |
| 6,387,343 B1 | 5/2002 | Klett | |
| 6,398,994 B1 | 6/2002 | Klett | |
| 6,399,149 B1 | 6/2002 | Klett et al. | |
| 6,430,935 B1 | 8/2002 | Klett et al. | |
| 6,656,443 B2 | 12/2003 | Klett | |
| 6,663,842 B2 | 12/2003 | Klett | |
| 6,673,328 B1 | 1/2004 | Klett et al. | |
| 6,780,505 B1 | 8/2004 | Klett et al. | |
| 6,809,304 B2 | 10/2004 | Besmann et al. | |
| 7,014,151 B2 | 3/2006 | Klett et al. | |
| 7,070,755 B2 | 7/2006 | Klett et al. | |
| 7,147,214 B2 | 12/2006 | Klett et al. | |
| 7,157,019 B2 | 1/2007 | Klett et al. | |
| 7,157,059 B1 | 1/2007 | Patton et al. | |
| 7,166,237 B2 | 1/2007 | Klett et al. | |
| 7,258,836 B2 | 8/2007 | Hill et al. | |

OTHER PUBLICATIONS

History of Carbon and Graphite Foams, http://www.ms.ornl.gov/researchgroups/cmt/foam/history_of_foams.html printed Aug. 16, 2007, 4 pages.

* cited by examiner

*Primary Examiner*—David R Sample
*Assistant Examiner*—Daniel Miller
(74) *Attorney, Agent, or Firm*—Luedeka, Neely & Graham, P.C.

(57) ABSTRACT

A carbon based foam article is made by heating the surface of a carbon foam block to a temperature above its graphitizing temperature, which is the temperature sufficient to graphitize the carbon foam. In one embodiment, the surface is heated with infrared pulses until heat is transferred from the surface into the core of the foam article such that the graphitizing temperature penetrates into the core to a desired depth below the surface. The graphitizing temperature is maintained for a time sufficient to substantially entirely graphitize the portion of the foam article from the surface to the desired depth below the surface. Thus, the foam article is an integral monolithic material that has a desired conductivity gradient with a relatively high thermal conductivity in the portion of the core that was graphitized and a relatively low thermal conductivity in the remaining portion of the foam article.

8 Claims, 7 Drawing Sheets

METHOD AND APPARATUS FOR PRODUCING A CARBON BASED FOAM ARTICLE HAVING A DESIRED THERMAL-CONDUCTIVITY GRADIENT

GOVERNMENT RIGHTS

This invention was made with government support under Contract No. DE-AC05-00OR22725 awarded by the U.S. Department of Energy to UT-Battelle, LLC. The government has certain rights in the invention.

FIELD OF THE INVENTION

The disclosure relates to carbon based foam articles and particularly relates to a carbon based foam article having a thermal conductivity gradient and a method for making the article.

BACKGROUND AND SUMMARY OF THE INVENTION

Carbon foams were first developed by researchers in the late 1960's. Shortly thereafter, processes were developed for controlling the structure and material properties of the carbon and the graphitic foams. A variety of applications for these materials were developed in the following decades and numerous different pre-cursors were developed for producing carbon foams.

For example, in the 1970's, carbon foam was produced from cork. In 1997, James W. Klett, at the Oak Ridge National Laboratory, reported the first graphitic foams with bulk thermal conductivities greater than 40 Watts per meter-Kelvin (W/m*K) and recently conductivities up to 180 W/m*K have been measured. This thermal conductivity may be compared to 400 W/m*K for copper. At a density of 0.45-0.6 g/cm3 for the graphite foam compared to a density of 8.9 g/cm3, the graphite foam has a specific thermal conductivity (thermal conductivity divided by density) of more than 4 times that of the copper. I.e. a specific thermal conductivity of 300 for the graphite foam to 45 for copper.

One method for producing carbon foam is described in U.S. Pat. No. 6,656,443 filed by James W. Klett on Jul. 26, 2002 entitled "Pitch-based Carbon Foam and Composites." In this patent, carbon foam is manufactured from pitch. For example, Mitsubishi ARA24 mesophase pitch was utilized.

Other methods and variations of making carbon based foam articles are described in the following U.S. Pat. No. 7,258,836 "Freeze resistant buoy system;" U.S. Pat. No. 7,166,237 "Pitch-based carbon foam heat sink with phase change material;" U.S. Pat. No. 7,157,019 "Pitch-based carbon foam heat sink with phase change material;" U.S. Pat. No. 7,147,214 "Humidifier for fuel cell using high conductivity carbon foam;" U.S. Pat. No. 7,070,755 "Pitch-based carbon foam and composites and use thereof;" U.S. Pat. No. 7,014,151 "Pitch-based carbon foam heat sink with phase change material;" U.S. Pat. No. 6,809,304 "High efficiency, oxidation resistant radio frequency susceptor;" U.S. Pat. No. 6,780,505 "Pitch-based carbon foam heat sink with phase change material;" U.S. Pat. No. 6,673,328 "Pitch-based carbon foam and composites and uses thereof;" U.S. Pat. No. 6,663,842 "Pitch-based carbon foam and composites;" U.S. Pat. No. 6,656,443 "Pitch-based carbon foam and composites;" U.S. Pat. No. 6,430,935 "Personal cooling air filtering device;" U.S. Pat. No. 6,399,149 "Pitch-based carbon foam heat sink with phase change material;" U.S. Pat. No. 6,398,994 "Method of casting pitch based foam;" U.S. Pat. No. 6,387,343 "Pitch-based carbon foam and composites;" U.S. Pat. No. 6,344,159 "Method for extruding pitch based foam;" U.S. Pat. No. 6,287,375 "Pitch based foam with particulate;" U.S. Pat. No. 6,261,485 "Pitch-based carbon foam and composites;" U.S. Pat. No. 6,037,032 "Pitch-based carbon foam heat sink with phase change material;" and U.S. Pat. No. 6,033,506 "Process for making carbon foam."

In one embodiment of the present invention, the carbon foam may be produced in the manner described above using pitch powder, granules, or pellets. However, the carbonizing heat treatments at the end of the process are replaced with a specialized form of heat treatment. In one embodiment, a carbon foam article that is substantially not graphitized is placed in an environment of an inert gas such as argon, and one surface of the article is exposed to radiant heat, preferably pulsed high density infrared heat, that is sufficient to raise the surface temperature of the article to a temperature above a graphitizing temperature (the temperature at which the foam changes from carbon to graphite). In this example, the graphitizing temperature for this particular precursor is about 2,000 degrees centigrade. So, the surface temperature of the article is heated to a temperature above 2,000 degrees centigrade. At this point, the foam begins to graphitize (become graphite) and becomes highly thermally conductive. Thus, the heat from the pulsed high density infrared source is quickly transferred through the graphitized portion of the foam to the interior portion of the foam core and it too is heated to a temperature above the graphitizing temperature.

As the heating process continues, the graphitizing temperature penetrates deeper and deeper into the core of the carbon foam, graphitizing the foam as the temperature within the core reaches the graphitizing temperature. By carefully and evenly applying the pulsed high density infrared heat to the surface of the graphitic foam, the penetration of the graphitizing temperature can be controlled to a desired depth. The power, duration, and duty cycle of heat pulses required to achieve the graphitizing temperature to a particular depth of an article will vary from article to article depending upon the size and properties of the article.

Radiant pulses of heat may be used to help achieve a sharp divide between the graphite portion and the carbon portion of the foam article. When a pulse is applied, the graphite is highly conductive thermally, and it quickly conducts the heat (thermal energy) to the interior edge of the graphite portion, where it heats the carbon portion of the foam. Since carbon foam is a poor thermal conductor, the temperature at the interface between the graphite portion and the carbon portion may be raised quickly to the graphitizing temperature, and a layer of the carbon foam is thereby graphitized. The temperature gradient is initially very steep at the interface between the graphite and the carbon foam. Then the heat pulse ceases and the graphite quickly cools, which quickly cools the interface region as well. By repeatedly heating and cooling the graphite portion of the foam block, the temperature gradient at the carbon-graphite interface remains very steep with each pulse, and thus the layer of carbon that is graphitized is sharply defined with each pulse.

At the depth to which the graphitizing temperature penetrates, there is an interface where the carbon foam is partially graphitized. The thickness (depth) of this interface may be controlled by the power and duration of the applied thermal pulses. To achieve a relatively thinner interface depth, the pulses may be applied with a relatively higher power and for a relatively shorter duration. To achieve a thicker interface depth, the pulses are applied with a relatively lower power and for a relatively longer duration. The more gradual heating provided by the lower power pulses tends to cause a more gradual heat gradient in the foam, which in turn produces a more gradual and larger interface of partially graphitized carbon foam.

One embodiment of the article is a porous carbon based foam article having a first region of graphitic carbon foam material, which may be pitch-based, having a relatively high thermal conductivity; and a second region of porous non-graphitic carbon foam, which may be pitch-based, contiguous with the first region and further comprising essentially non-graphitic carbon foam having a relatively low thermal conductivity, wherein the thermal conductivity of the graphitic foam is substantially larger than the thermal conductivity of the non-graphitic carbon foam.

BRIEF DESCRIPTION OF THE DRAWINGS

The present invention may best be understood by reference to a detailed description of one embodiment, in which.

DETAILED DESCRIPTION OF THE DRAWINGS

Figure 1:
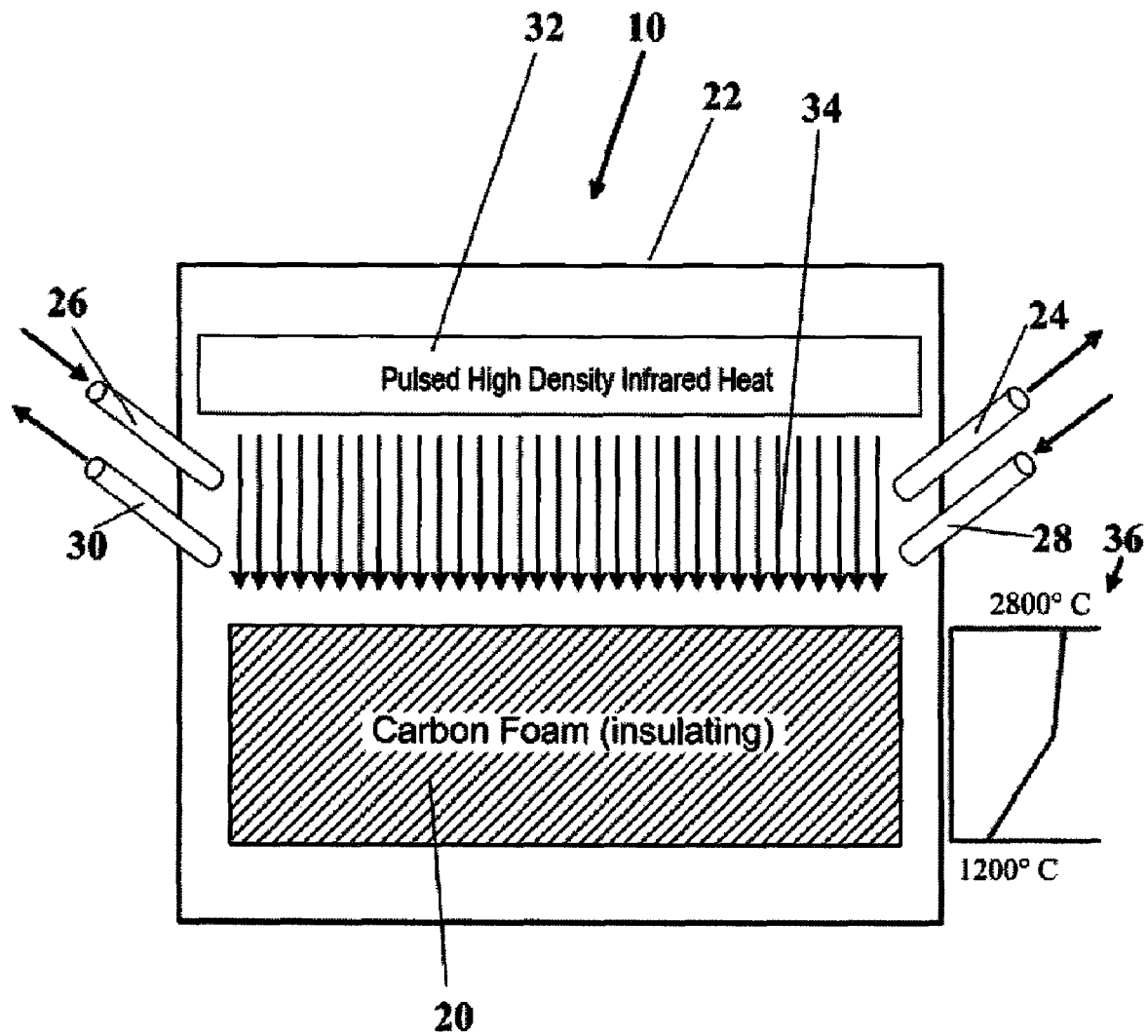
FIG. 1 illustrates carbon foam being heated by pulsed high density infrared heat with a temperature gradient shown beside the illustration.

Referring now to the drawings in which like reference characters designate like or corresponding parts throughout the views, there is shown in FIG. 1 a furnace 10 used for graphitizing carbon foam. The furnace 10 includes an insulated enclosure 22 for containing and maintaining the heat at a desired temperature within the enclosure 22. The enclosure 22 includes multiple input ports, such as ports 26 and 28, and multiple output ports such as 24 and 30. These input and output ports may be used to control the environment within the enclosure 22. For example, the output ports 24 and 30 may be used to draw a vacuum within the enclosure 22 if desired, and the input ports 26 and 28 may be used to provide an inert gas within the enclosure 20. Also, the input ports 26 and 28 may be used to pressurize the interior of the enclosure 22 as desired. In addition, the temperature of the gas within the enclosure 22 can be controlled by continuously introducing cool gas or warm gas as desired, and evacuating the gas within the furnace 10 at the same time. Thus, for example, if the gas temperature within the enclosure 22 exceeds a desired level, cooler gas may be introduced into the enclosure 22, while hot gas is simultaneously removed from the enclosure 22.

In this embodiment, the carbon foam block 20 is an insulating material made according to the discussion above, and particularly according to the discussion in U.S. Pat. No. 6,656,443, herein incorporated by reference. In one embodiment, block 20 is a porous pitch-based carbon foam. In FIG. 1, the illustration is shown from the side and, therefore, the height of the foam block 20 as depicted corresponds to the depth measurement of the foam block as given above.

A pulsed high density infrared heat source 32, such as a high density infrared heat lamp, is provided within the enclosure 22 providing uniform radiant infrared heat 34 on the upper surface of the block 20. One example of heat source 32 is a plasma arc lamp made by Vortec Industries having a power rating of 750,000 watts, which may be placed eight to twelve inches from the foam block 20. However, other heat sources and configurations may be used. In one embodiment, the heat source is a radiant heat source capable of producing heat pulses sufficient to graphitize the carbon foam. As the heat 34 is applied, it is desired, for example, to achieve a thermal profile 36 as shown in FIG. 1. However, as shown in FIG. 1, the carbon foam block 20 is still insulating and has not yet graphitized.

Figure 2:
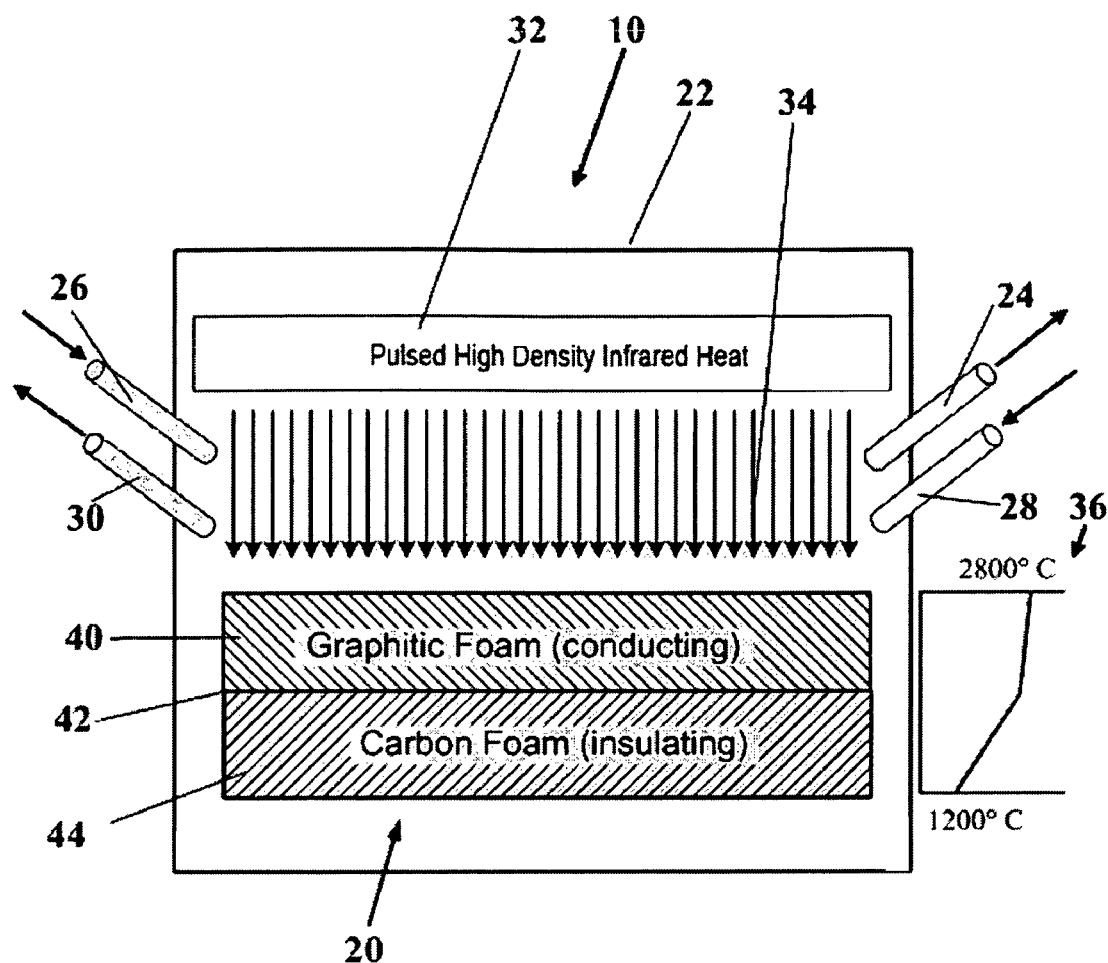
FIG. 2 is an illustration of a combination of graphitic foam and carbon foam being heated by the pulsed high density infrared heat during the process of graphitizing the carbon foam.

Referring now to FIG. 2, a similar drawing is shown of the furnace 10, but in this case, the foam block 20 has converted in part to a graphitic foam portion 40 along the top surface of the foam block 20. As indicated by the thermal profile, the graphitizing temperature has penetrated to a level indicated by interface 42. In other words, the heating from the pulsed high density infrared heat source 32 has raised the temperature of the carbon foam on the top side of the block 20 to a temperature above the graphitizing temperature. As the foam graphitizes, it becomes thermally conductive and quickly transmits the heat from above downwardly into the carbon foam until the graphitizing temperature has reached a desired depth as shown in FIG. 2. By thermally conductive, it is meant that the thermal conductivity of the graphite foam is substantially larger than the thermal conductivity of the carbon foam.

For example, typical carbon foam has a conductivity of about one W/m*K, while The conductivity of typical graphite foam ranges from about 30 to 180 W/m*K. In this example, the graphitizing temperature has reached a depth of approximately half the thickness of the carbon foam. Thus, the foam block 20 has an upper graphite portion 40 and a lower carbon portion 44. The interface 42 is shown as a line in FIG. 2. However, it will be understood that this interface can be a sharp interface or a gradual interface between the graphitic foam portion 40 and the carbon foam portion 44, depending on the rate at which the carbon foam block 20 was heated. In general, the more gradual heating results in a larger interface in the depth dimension.

As the graphitizing temperature penetrates the carbon foam block 20, the carbon portion 44 converts into the graphite portion 40. Depending upon the infrared heating that is used, the temperature of the gas within the enclosure 22 and the properties of the carbon foam block 20, the interface 42 will vary. In other words, the block may change rapidly from graphite to carbon to produce a relatively small interface or there may be a larger interface in which the foam block 20 is formed of carbon that is only partially graphitized. In either event, the interface 42 is a continuous uniform juncture between the graphitic foam 40 and the carbon foam 44, such that the overall block 20 remains integral as opposed to separate pieces of graphitic foam and carbon foam. The bond between the graphitic foam 40 and the carbon foam 44 is strong, roughly equivalent to the bonding of the carbon foam 44 to itself.

In this particular example, using the foam block 20 as described above, the pulsed high density infrared heat is applied to the surface of the block 20 for a period of time sufficient to cause the graphitizing temperature to penetrate to a desired depth into the core of the block 20. The pulsed heating is continued until the graphitizing temperature has penetrated to a desired depth. At the same time, the internal gas temperature within the enclosure 22 is maintained below the graphitizing temperature, for example, about 600 degrees C., by introducing fresh argon into the enclosure 22.

In one embodiment, the heating may be accomplished in an environment of slightly pressurized argon. While the temperature of block 20 is allowed to decrease, the argon is gradually reduced in pressure to atmospheric pressure at the point in time when the graphitic foam 40 and carbon foam 44 each reach a temperature of approximately ninety degrees centigrade. In alternate embodiments, the graphitizing heating may be done in a vacuum, and in such case the vacuum is gradually released during the cooling phase by introducing argon gas or another inert gas at a rate sufficient to achieve the desired rate of cooling. Cooling is allowed at a rate sufficiently slow to avoid damaging the article due to thermal shock and thus the rate of desirable cooling will vary depending upon the configuration and dimensions of the article, as well as the graphite vs. carbon foam composition of the article It will be understood that multiple surfaces of a carbon foam block may be radiantly heated at the same time or at different times to achieve desired thermal conductivity gradients. Likewise, only a portion of a surface may be heated by using appropriate heat sources. For example, a dot, line or other shape may be heated on a surface to produce a spot region of graphite on a carbon foam article using a radiant lamp and a mask or using a heater such as a laser.

Referring again to FIG. 2, the resulting block 20 of graphitic foam 40 and carbon foam 44 may, if desired, be filled with a phase change material and incorporated into the heat shields and heat sinks as described in U.S. Pat. No. 7,157,059. The graphitic foam 40 filled with a phase change material will operate as an effective heat sink while the carbon foam portion 44 of the block 20 will continue to provide insulative qualities, and the phase change material will protect the carbon foam 44. If desired, the combination graphitic foam 40 and carbon foam block 20 may be filled with a phase change material as described in U.S. Pat. No. 7,157,019. The phase change material in certain applications will improve the insulating capacity of the carbon foam 44. As the temperature of the carbon foam 44 rises to the phase change temperature of the material within the carbon foam 44, the phase change material will limit the increasing temperature of the carbon foam 44 at least temporarily. Thus, the overall temperature of the foam 44 will remain lower for a longer period of time, and thereby increase the insulating shielding effect of the carbon foam 44.

Figure 3:
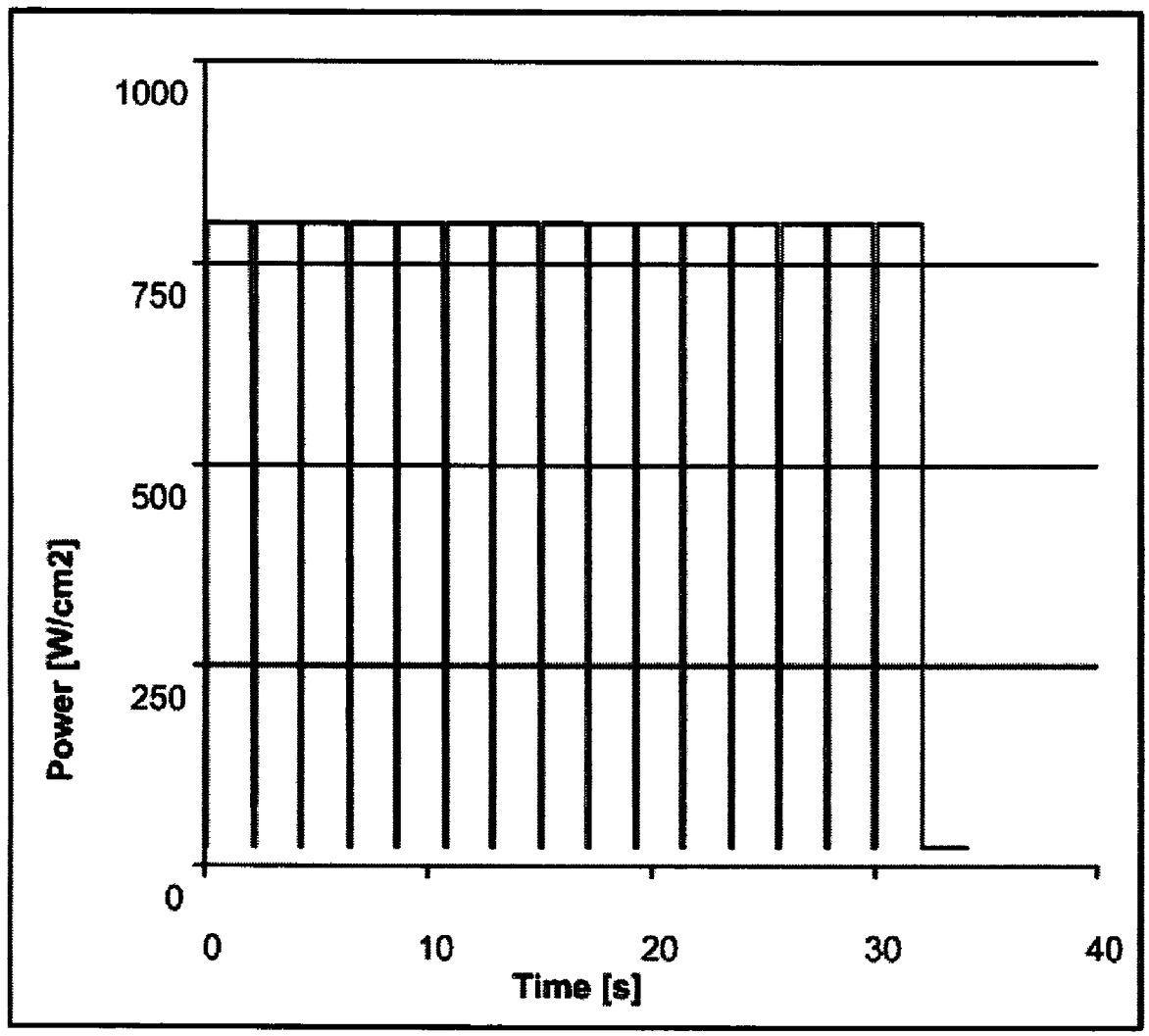
FIG. 3 is a graph of representative pulses of radiant heat that may be used in an embodiment of the invention.
Figure 4:
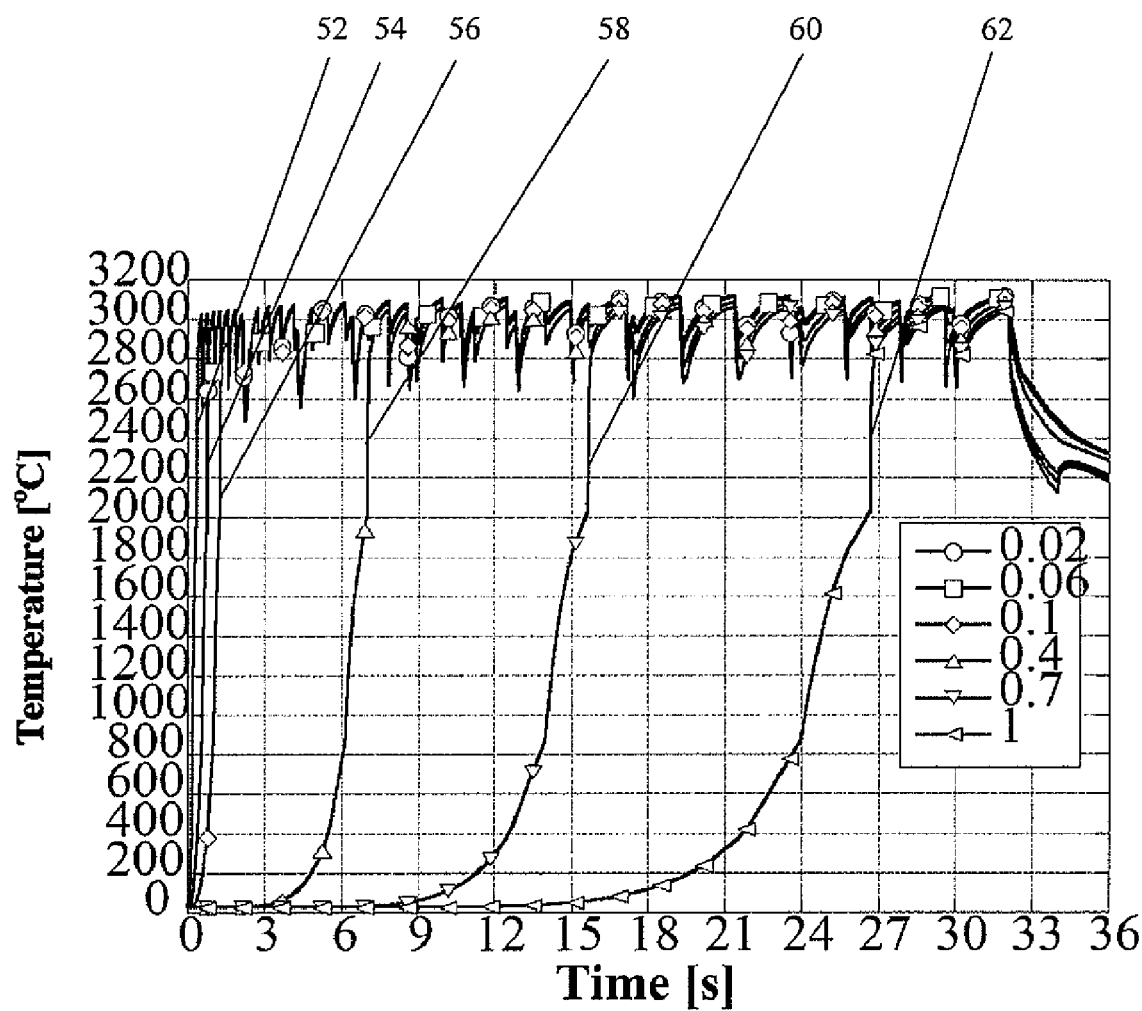
FIG. 4 is a graph of representative temperature profiles showing the predicted temperature of carbon based foam as radiant heat pulses are applied.

Although a wide variety of heat sources may be used, FIG. 3 illustrates one possible heat source for use in the invention, namely, an infrared heat lamp that is pulsed on for two seconds at eight hundred watts per square centimeter, and is turned off for twenty milliseconds between each pulse. Applying such heat source to a one inch block will produce temperature profiles within the foam block as shown by FIG. 4 in which the temperature profiles have been produced by computer modeling. Referring to FIG. 4, a temperature profile is shown through 1" thick block of carbon foam versus time. Lines 52, 54, 56, 58 60 and 62 indicate the temperature at a particular depth at any given time. Lines 52, 54, 56, 58 60 and 62 represent the temperature of the block 20 at depths of 0.02, 0.06, 0.10, 0.4, 0.7 and 1 inch, respectively. If the temperature at that depth exceeds 2500 C, then that depth is considered graphitized and conductive. If it has not graphitized, it will be insulating.

Referring to lines 52, 54 and 56, the temperature at depths of 0.02, 0.06 and 0.1 inch rises very rapidly in response to the radiant heating and is graphitized in less than two seconds. As shown by line 58, the temperature at a depth of four tenths of an inch remained well below the graphitizing temperature for about six seconds and then rapidly rose to the graphitizing temperature by the seventh second of heating. Although the slopes of lines 60 and 62 are not as steep as line 58, the temperature remained well below the graphitizing temperature for a substantial time and then quickly rose to and through the graphitizing temperature. These rapid rises in temperature at different depths occurring at different times illustrates that the depth of the graphitized material may be controlled by controlling the heating time.

Figure 5:
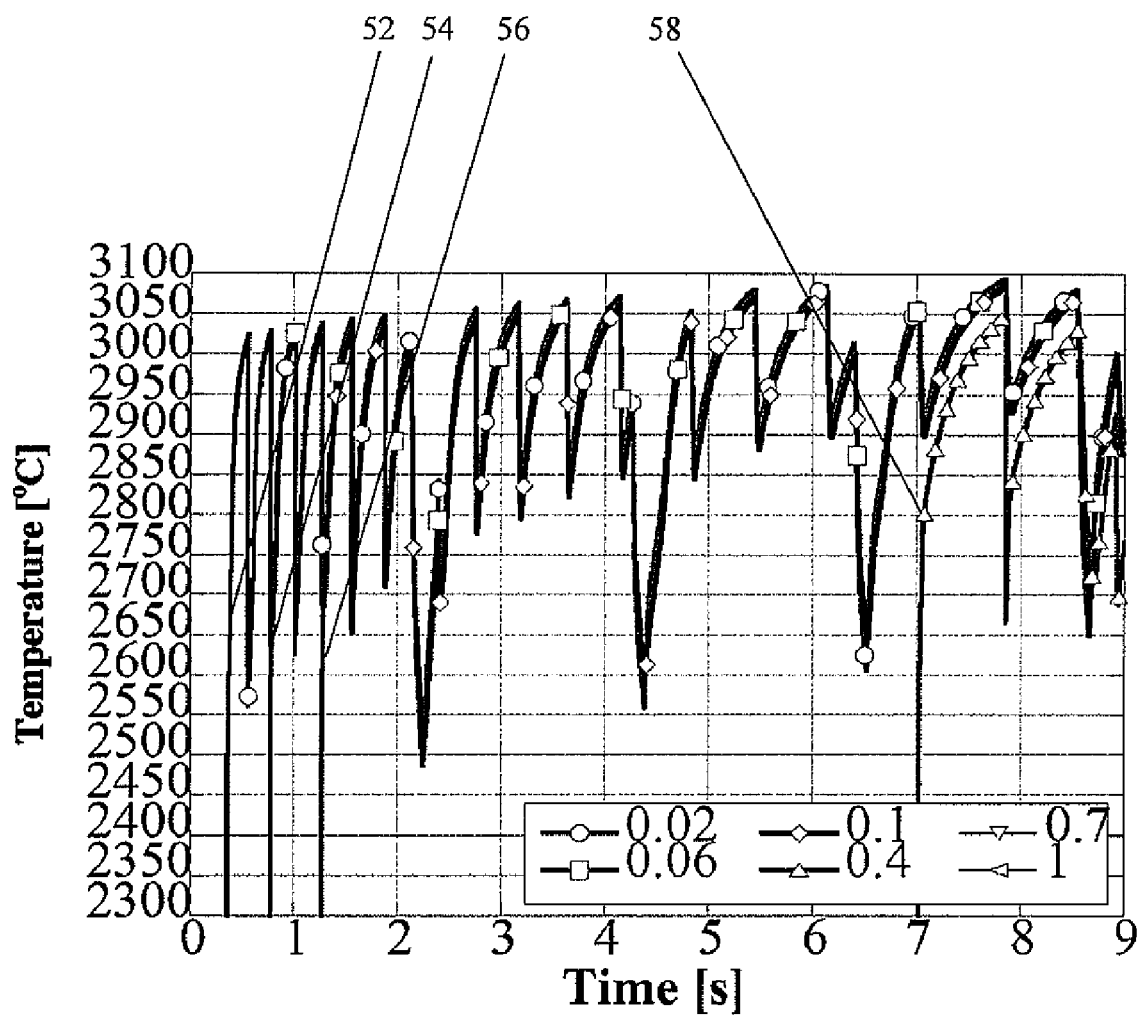
FIG. 5 is a zoomed-in view of a portion of FIG. 4.
Figure 6:
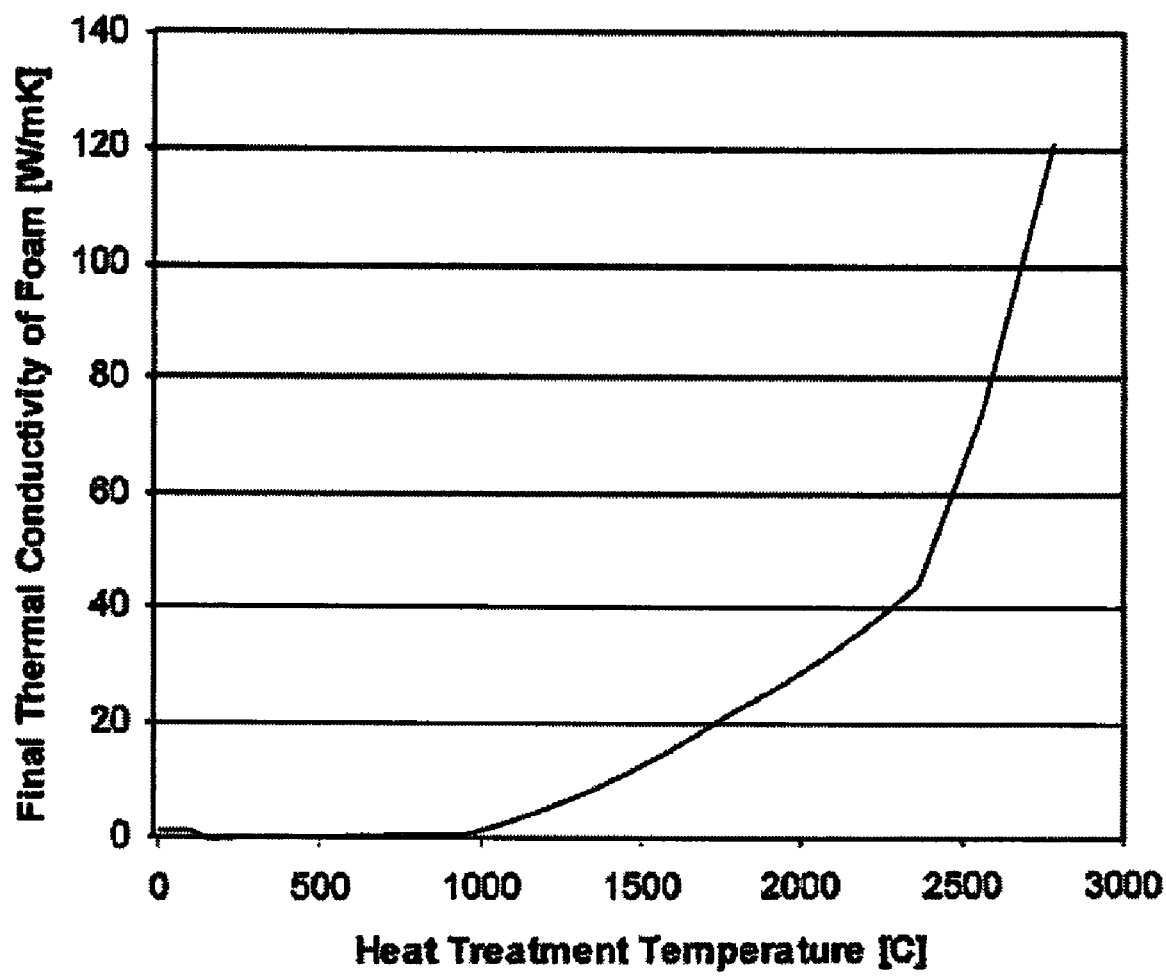
FIG. 6 is a plot illustrating relative graphitization vs. heat treatment for graphite foam showing a transition from carbon foam to graphite foam.

Referring to FIG. 5, a zoomed-in section of FIG. 4 is shown. Using pulses of two seconds at eight hundred watts per square centimeter and intervening twenty millisecond off periods between pulses, and applying the radiant heat on the face of the foam, it can be seen that four tenths of an inch deep of the sample will be graphitized after nearly 7 seconds. This would leave six tenths of an inch deep insulating carbon foam joined to the graphite foam in a monolithic material.

Figure 7:
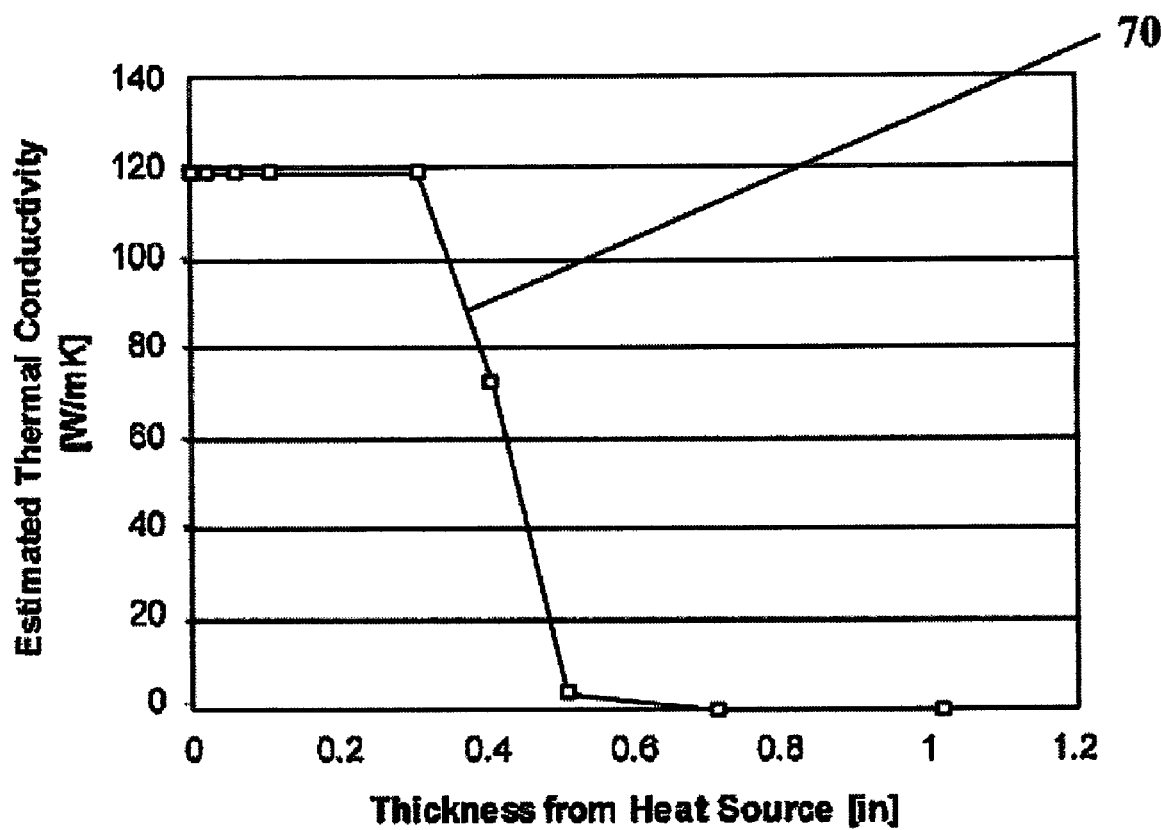
FIG. 7 is a plot illustrating a thermal conductivity gradient of a carbon/graphite foam block that may be produced by radiant heat treating as described herein.

Similarly, the transition between graphite and carbon foam may be controlled to be a rapid transition as illustrated in FIG. 7. The plot line 70 illustrates a computer model representation of the conductivity of a graphite/carbon foam block that was heat treated as described above for seven seconds. Approximately the first three tenths of an inch depth of the block is graphite and has a thermal conductivity of one hundred twenty watts per meter*K. Then from a thickness of about three tenths of an inch to a thickness of about one half inch, the conductivity plunges to the conductivity of non-graphitized carbon foam. Thus, by the above method, a desired conductivity gradient is formed in a carbon based foam block.

Having described examples of the present invention, it will be understood that the invention is defined by the appended claims. The examples given above are not intended to limit the scope of the claimed invention, and it will be understood that the invention is capable of numerous rearrangements, modifications, and substitutions of parts without departing from the scope of the invention as defined by the appended claims.

What is claimed is:

1. A carbon based foam article comprising:
   a first region of essentially graphitic carbon foam having a first thermal conductivity and having substantially no non-graphitic carbon foam; and
   a second region of essentially non-graphitic carbon foam contiguous with the first region and having substantially no graphitic carbon foam and having a second thermal conductivity, wherein the first thermal conductivity of the graphitic carbon foam of the first region is substantially larger than the second thermal conductivity of the non-graphitic carbon foam of the second region;
   wherein the first and second regions together comprise a monolithic foam structure.

2. The article of claim 1 wherein the first region comprises heat carbon foam heat treated at only one surface.

3. The article of claim 1 wherein the first region comprises radiant heat treated carbon foam.

4. The article of claim 1 further comprising partially graphitized carbon foam forming an interface region.

5. The article of claim 1 further comprising a phase change material disposed in at least a portion of the foam article.

6. The article of claim 1 wherein said first and second regions comprise pitch based graphite foam and pitch based carbon foam respectively.

7. The article of claim 1 wherein the first and second regions comprise porous graphite foam and porous carbon foam respectively.

8. The carbon based foam article of claim 1 wherein the first thermal conductivity of the graphitic carbon foam of the first region ranges from about 30 to about 180 W/m*K and wherein the second thermal conductivity of the non-graphitic carbon foam of the second region is about one W/m*K.

* * * * *